United States Patent
Shardanand

(10) Patent No.: US 7,953,753 B2
(45) Date of Patent: May 31, 2011

(54) NEWSMAKER VERIFICATION AND COMMENTING METHOD AND SYSTEM

(75) Inventor: Upendra Shardanand, New York, NY (US)

(73) Assignee: Daylife, Inc., New York, NY (US)

( * ) Notice: Subject to any disclaimer, the term of this patent is extended or adjusted under 35 U.S.C. 154(b) by 478 days.

(21) Appl. No.: 12/182,006

(22) Filed: Jul. 29, 2008

(65) Prior Publication Data

US 2009/0083283 A1    Mar. 26, 2009

Related U.S. Application Data

(63) Continuation of application No. 11/260,720, filed on Oct. 27, 2005, now abandoned.

(51) Int. Cl.
*G06F 7/04* (2006.01)
*G06F 17/40* (2006.01)

(52) U.S. Cl. ......... 707/784; 707/705; 707/783; 707/943

(58) Field of Classification Search .................... 707/10, 707/102, 999.01, 999.102, 705, 783, 784, 707/943

See application file for complete search history.

(56) References Cited

U.S. PATENT DOCUMENTS

| | | | |
|---|---|---|---|
| 2002/0143776 A1* | 10/2002 | Hirose et al. | 707/10 |
| 2004/0093558 A1* | 5/2004 | Weaver | 715/500 |
| 2004/0230572 A1* | 11/2004 | Omoigui | 707/3 |

* cited by examiner

*Primary Examiner* — James Trujillo
*Assistant Examiner* — Bruce M Moser
(74) *Attorney, Agent, or Firm* — King & Spalding LLP

(57) ABSTRACT

An on-line article comprising instances of newsmakers is provided by an Internet connected news server or news aggregator server and the names of the newsmakers are automatically identified by a newsmaker verification and commenting module. The article is displayed to a reader on an Internet connected client computer. The instances of the newsmakers in the article are emphasized such that they stand out in the article. The reader initiates a verification process by indicating that he is a newsmaker. The newsmaker verification and commenting module is in communication with a verification database and the identity of the reader is verified as the newsmaker through a series of questions and answers. After verification, comments provided by the reader are stored by the newsmaker verification and commenting module. The comments and article are published such that the comments are displayed conspicuously with the article on any client computer accessing the article.

21 Claims, 3 Drawing Sheets

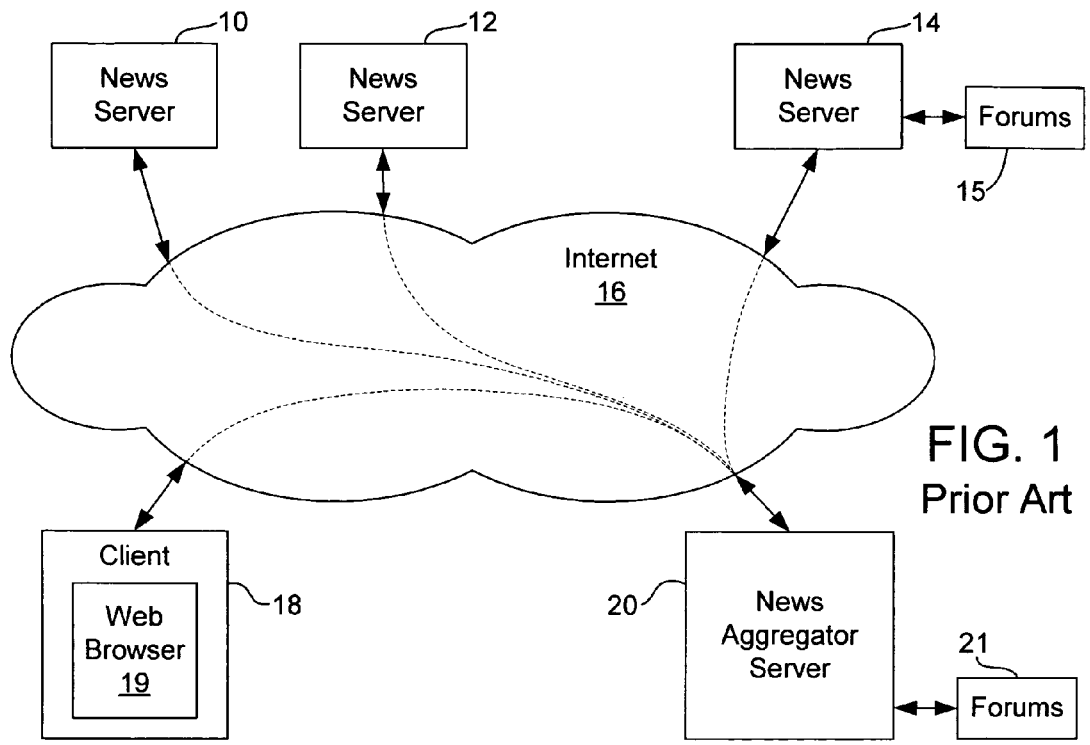
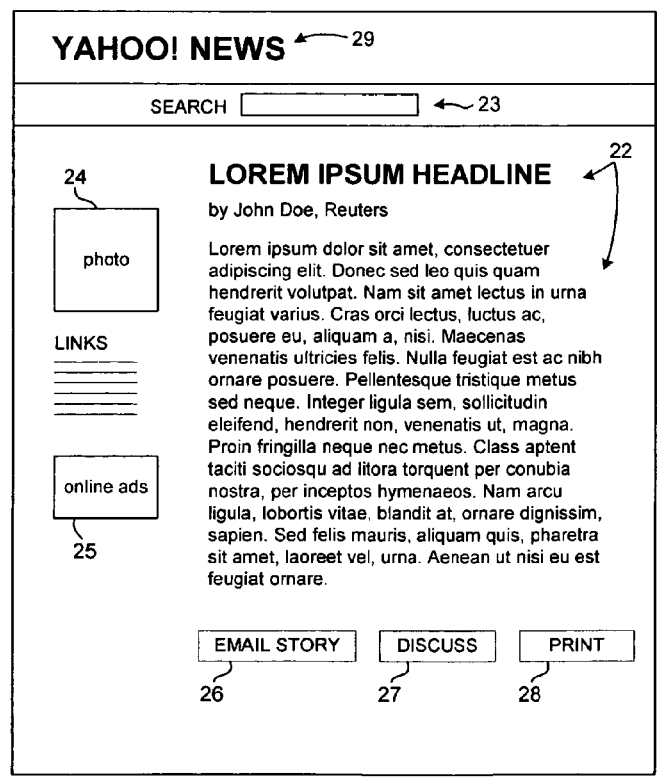
FIG. 2
Prior Art

NEWSMAKER VERIFICATION AND COMMENTING METHOD AND SYSTEM

This application is a continuation of application Ser. No. 11/260,720 filed Oct. 27, 2005, the contents of which are hereby incorporated by reference in their entirety.

BACKGROUND

Internet users have available to them many news sources. Referring to FIG. 1, which shows an exemplary prior-art system for on-line news distribution, client computer 18 is connected to the Internet 16 and a user reads articles displayed on web browser 19. Articles are delivered to client computer 18 by Internet connected news servers 10, 12, and/or 14. There may be many more news servers than what is shown. As is well known, articles are displayed in web browser 19 simply by typing in the web address, (universal resource locator or universal resource identifier) of any of the news servers 10, 12, or 14. News servers such as 10, 12, and 14 may supply news from sources such as Agence France-Press (AFP), Reuters, Associated Press (AP), Los Angeles Times, New York Times, USA Today, National Public Radio (NPR), CNN.com, Slashdot.org and thousands of other online local, regional, national, and international news outlets.

There are many other websites where Internet users can receive news, such as Yahoo! News (http://news.yahoo.com) and Google News (http://news.google.com). While these, and like websites do not typically generate any original news content, they do provide a convenient way for Internet users to view articles from a multiplicity of sources. For example, Internet connected news aggregator server 20 receives articles from news servers 10, 12, and 14. Client computer 18 connects to news aggregator server 20, and may optionally connect directly to any other news server connected to the Internet.

A news story, or article, whether supplied directly from a news server such as news servers 10, 12, and 14, or from a news aggregator server, such as news aggregator server 20, comprises text, and optionally images. A newsmaker is anyone who appears in the news story. An article may comprise one or more than one newsmaker. For example, a story written about a policy proposed by the President of the United States may contain a quote from the president, from the president's spokesman, from a senator, from a judge, from a political commentator, and from a "man on the street". All of these people are newsmakers.

Some news servers and news aggregator servers provide forums, also called discussion forums, comment forums, comment boards, message boards, and the like, for readers to comment on a selected story. In most cases, a reader can enter the forum associated with a story by clicking a link available at the bottom of the story. For example, news server 14 communicates with forums 15, and news aggregator server 20 communicates with forums 21. Forums 15 enables a user at client 18 to comment on an article supplied by news server 14, whereas forums 21 enables a user at client 18 to comment on any story or article aggregated by news aggregator server 20, such as articles from news servers 10, 12 and 14. Forums are well understood by those of ordinary skill in the art.

FIG. 2 shows an exemplary prior-art screenshot image of an on-line article displayed in a web browser. Almost every on-line article accessible via the Internet and displayed in a web browser is comprised similarly, although the exact layout may differ. The web page is comprised of the following: the name of the news source or news aggregator 29; a search bar or search function 23; the story including the headline and the author 22; an image 24; online advertising 25; an "email story" link or button 26; a "print" link or button 28; and, as discussed above, a "discuss" link or button 27 to enter a forum associated with the article.

A forum associated with a popular article may receive hundreds or even thousands of comments a day. While providing an outlet for readers to express their opinion, these forums do not necessarily provide any useful, valid, or enlightening information. In fact, it is well known that posts to forums such as these are rarely pertinent to the story, and often consist of outrageous or shocking comments meant to provoke others. It is nearly universally true that readers who post comments have no relation to any of the newsmakers in the story, and their comments amount to little more than chatter between readers. This remains the case even for moderated forums where a person, that is the moderator, or a group of people who are registered to moderate such as in Slashdot.org, reads through each comment submitted by every reader and approves each post. This is clearly impractical and extremely time consuming for popular forums, and besides, provides little, if any, benefit in terms of enhancing the content of the article.

In the event a newsmaker, that is someone who is mentioned in an article, desires to comment on the article, the newsmaker may post a comment in the same manner as any other reader. Newsmakers, however, almost never comment in these forums; it is a waste of time because, among other things, there is no differentiation between a comment from a newsmaker and a comment from a random reader. And it is extremely common for readers to post comments pretending to be a newsmaker. For example, in a story where the newsmaker is Bill Gates, it is almost a certainty that a reader who is not Bill Gates will post a comment using the name "BillG", "BillGates", or similar. Whether the reader actually expects to be believed as the newsmaker is irrelevant; the effect is that the any residual relevancy the forum may have had to the article or newsmaker is completely eroded. As a result, even if the newsmaker posts a comment, the comment gets lost in the chatter of the forum.

In addition to this, a newsmaker who desires to correct or formally comment on the article has no expeditious, convenient, and reliable way to do so; the only recourse is to attempt to contact the publisher, the author of the article, or the editor of the article and implore them to publish a correction or addendum containing the newsmakers comments or corrections. Unsurprisingly, publishers are loath to do this. In the unlikely event the newsmaker is successful, at best, the publisher, author, or editor publishes an edited version of the newsmaker's comments, sometimes days after the original article was published. Thus a need presently exists for a newsmaker verification and commenting system.

SUMMARY

The present invention provides a newsmaker verification and commenting method and system. In Internet based on-line publishing, on-line articles are served from one or more news servers or news aggregator servers connected to the Internet. The articles are displayed on an Internet connected client computer operable to access and display the articles. The articles are displayed in a web browser. In the present invention, an article is provided. The article comprises text and at least some of the text comprises an instance comprising the name of a newsmaker. There may be more than one newsmaker and more than one instance. A newsmaker verification and commenting module in communication with a news server or news aggregator server automatically identifies the name of the newsmaker. If there is more than one newsmaker, all of the names are identified. The names are automatically identified by analyzing the text of the article with, for example, entity extraction methods. Next the article is displayed to the reader at the client computer. The instance of the newsmaker is emphasized such that the instance is set apart from the text of the article. A verification process is initiated when the reader, desiring to comment on the article, selects one of the emphasized names. The verification process electronically verifies the identity of the reader as the newsmaker. Electronically verifying comprises generating out-of-wallet questions from a verification database in communication with the newsmaker verification and commenting module, transmitting out-of-wallet information to the verification database, comparing the out-of-wallet information to the verification database, and receiving comparison result at the newsmaker verification and commenting module. If the comparison results are favorable, that is, the identity of the reader is verified as the newsmaker, comments provided by the reader are stored by the newsmaker verification and commenting module. Finally, the comments and the article are published such that the comments are displayed conspicuously with the article on any Internet connected client computer accessing the article.

The foregoing paragraph has been provided by way of general introduction, and it should not be used to narrow the scope of the following claims. The preferred embodiments will now be described with reference to the attached drawings.

BRIEF DESCRIPTION OF THE DRAWINGS

FIG. 1 is an prior art on-line news distribution system.

FIG. 2 is an prior-art screenshot image of an on-line article displayed in a web browser.

DETAILED DESCRIPTION OF THE PRESENTLY PREFERRED EMBODIMENTS

Figure 3:
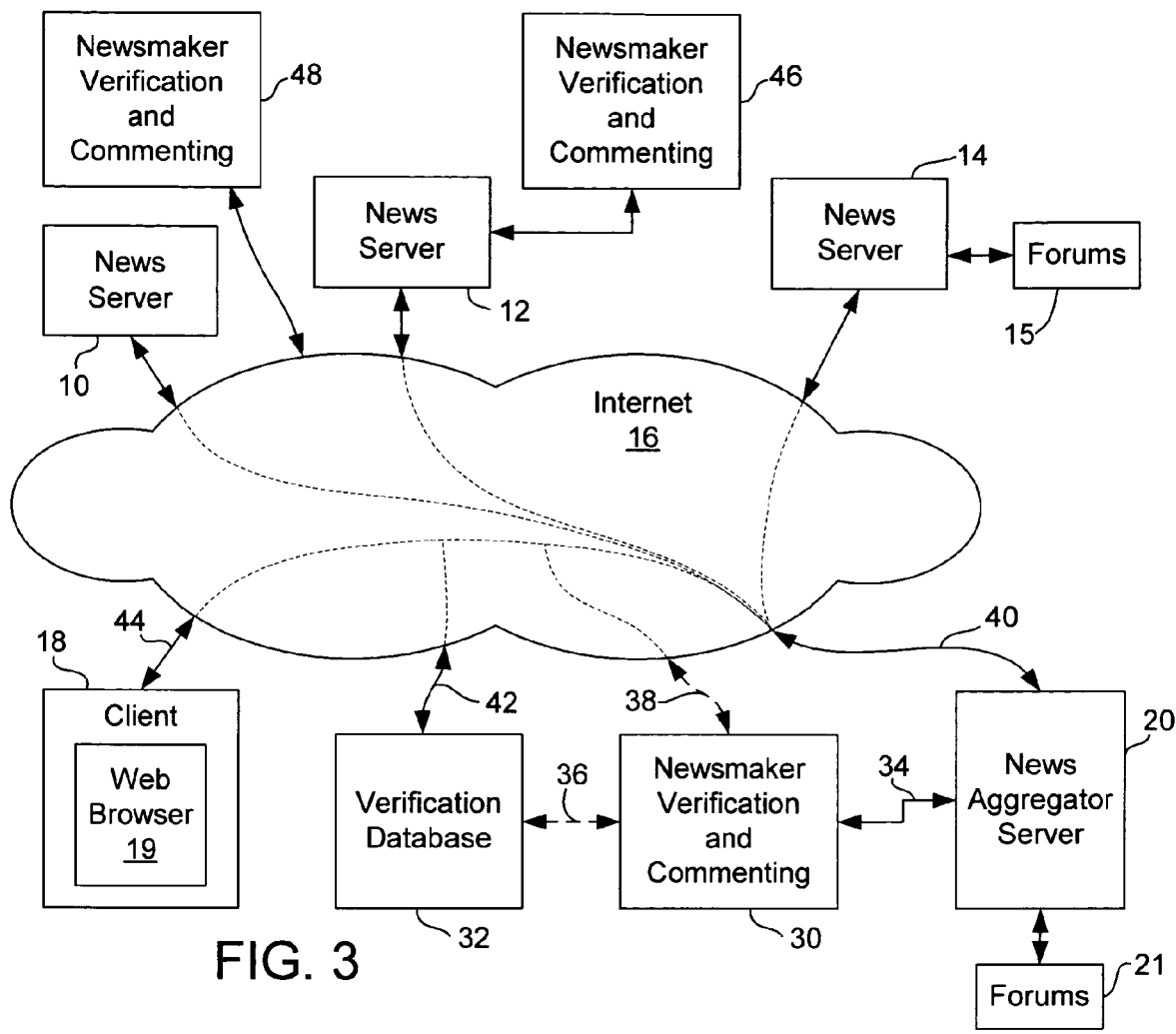
FIG. 3 is a newsmaker verification and commenting system.

In a newsmaker verification and commenting system, shown in FIG. 3, an on-line article is provided. As discussed above, the article is provided via the Internet 16 from news servers 10, 12 and/or 14, or from news aggregator server 20. The article is displayed at Internet connected client computer 18 in web browser 19. The article may be a news article or any other type of article, whether or not it contains current news, such as background information, bios, sources of information, and the like. The article may also comprise aggregated content from a multiplicity of other articles. The article comprises text, with at least some of the text comprising the name of a newsmaker. The article may further comprise an image or images, links to audio and video, embedded audio and video, links to other articles, links to web pages and blogs, and the like. As used herein, the term "web browser content" is understood to mean, either by themselves or in combination, text, an image or images, links to audio and video, embedded audio and video, links to other articles, links to web pages and blogs, and other types of content that are displayable or accessible in a web browser.

Recall, a newsmaker is anyone who appears in the news story. A newsmaker may be the subject of a sentence in the article, the object of a sentence in the article, the author of the article, the editor of the article, the publisher of the article, a publicist or similar person representing the newsmaker, a company or organization wherein the company or organization has an official representative or spokesperson, and the like. Each mention, or occurrence of the name of the newsmaker in the article is referred to herein as an instance. There may be more than one newsmaker in the article, with each newsmaker having one or more instances. It is understood that any disclosure directed to one newsmaker also applies to more than one newsmaker.

A newsmaker verification and commenting (NVC) module 30, the workings of which will be discussed below, is in communication with news aggregator server 20 and with a verification database 32. Briefly, the article is displayed to a reader at client computer 18 on web browser 19; the reader, who is also a newsmaker, desires to comment on the article; the reader accesses NVC 30 via the Internet 16; the reader's identification is electronically verified as the newsmaker with verification database 32 in communication with NVC 30; the reader provides comments which are stored in a database in NVC 30; and the comments are published with the article such that, henceforth, any Internet connected computer accessing the article through news aggregator server 20 will display the article and the comments from the newsmaker.

NVC 30 comprises computer readable code which when executed by a computer causes the computer to perform a newsmaker verification and commenting method which is disclosed in detail below, with reference to FIG. 4. News aggregator server 20 may comprise NVC 30, in which case NVC 30 is in direct communication (34) with news aggregator server 20. Alternatively, NVC 30 may be a separate computer in which case NVC 30 is in communication (38) with news aggregator server 20 via the Internet 16, or via any other prior art communications network. In any case, it is understood that the placement of NVC 30, and the means of communication between NVC 30 and news aggregator server 20, is in no way limiting to the present invention.

Likewise, verification database 32 and NVC 30 are in direct communication (36), in which case the verification database 32 and NVC 30 are stored on the same computer. In another embodiment, verification database 32 and NVC 30 are physically separate and are in communication (42) via the Internet.

FIG. 3 additionally shows another newsmaker verification and commenting module 46 in communication with news server 12, and yet another newsmaker verification and commenting module 48 in communication with the Internet 16. An NVC may be shared among multiple news servers and news aggregators. For example, NVC 48 may be in communication with news servers 10 and 12 and other news servers and news aggregator servers not shown. NVCs 46 and 48 are shown merely to illustrate that individual news servers may host their own NVCs in addition to, separate from, or complementary to NVC 30. With this in mind, it is understood than any discussion of NVC 30 and verification database 32, and their communications, methods, functions, systems, and operations with news aggregator server 20, may be equivalently extended to any other news aggregator server, news server, and any other equivalent device whether or not shown in any of the figures.

As was discussed with reference to FIG. 1, optional prior art forums 21 is shown in communication with news aggregator server 20, and optional prior art forums 15 is shown in communication with news server 14. The presence or absence of the prior art forums have no bearing on the present invention.

Figure 4:
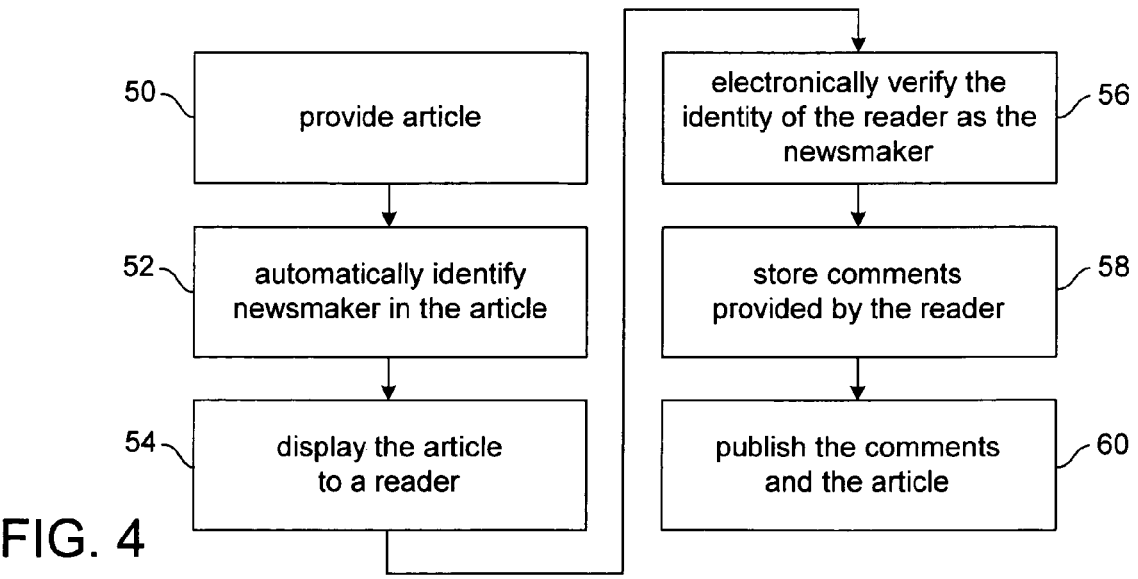
FIG. 4 is a newsmaker verification and commenting method.

FIG. 4 shows a newsmaker verification and commenting method which operates in an on-line publishing system wherein on-line news articles served from one or more news sources connected to the Internet are displayed on an Internet connected client computer. The client computer is operable to access and display the one or more news sources to the reader, by way of, for example, a web browser.

Examining FIG. 4, an article is provided (step 50). The article comprises text. The article may also optionally comprise images and other web browser content. At least some of the text comprises the name of a newsmaker. Each mention, or occurrence of the name of the newsmaker in the article is referred to as an instance. There may be more than one newsmaker in the article, with each newsmaker having one or more instances. As already discussed, any discussion directed to one newsmaker may be equivalently applied to more than one newsmaker.

Next, the name of the newsmaker is automatically identified (step 52). If there is more than one newsmaker, then all of the names of the newsmakers are automatically identified. The term "automatically identified" is used, rather than the word "identified" to indicate that the article is electronically analyzed or parsed, and the names of the newsmakers obtained or extracted, when the article is provided and without human intervention.

Extracting information from documents such as on-line articles and web pages is generally referred to by those skilled in the art as information extraction, and specifically as entity extraction, or named entity recognition. Many well understood linguistic, knowledge-based, statistical, probabilistic, and hybrid methods for entity extraction may be employed. In one embodiment Hidden Markov Models are used. In other embodiments, rule-based methods, machine learning techniques such as Support Vector Machine learning methods, and Conditional Random Fields are implemented either by themselves or in combination. Furthermore, there are many commercial products available employing these and other techniques, for example IdentiFinder™ from BBN Technologies, products from Basis Technology Corp., Verity Inc., Convera, and Inxight Software Inc. as well as freely available software for developing and deploying software components that process human language, such as GATE (General Architecture for Text Engineering). These methods, models, algorithms, systems, and products are well understood by those of ordinary skill in the art.

Once the newsmakers in the article are identified, the article is displayed to a reader (step 54). The article is displayed for example as a webpage in the web browser of a computer connected to the Internet. So as to distinguish the newsmaker(s) in the article from the other text, at least one instance of the newsmaker is optionally emphasized by, for example, modifying text attributes of the text comprising the instance. For example the font type, or font size, or font color, or a combination of the three may be modified. In one example, the text of the article comprises black text, and the instance comprises text that is blue and bold, or underlined, or italicized, or the like. In an alternative embodiment the newsmakers' names are displayed in a list, for example alongside the article. The list may comprise the newsmakers' names in text, photos of the newsmakers, descriptions, and the like.

In the intuitive world of web site navigation, emphasizing the instance suggests to the reader to move the mouse cursor over the instance, or to click on the instance. In one embodiment, when the reader moves the mouse cursor over the instance and clicks on the instance, the reader is directed to a verification web page, which is displayed in the web browser. In another embodiment, when the reader moves the mouse cursor over the instance and/or clicks on the instance a dialog box, a window or a pop-up is displayed containing a query. One exemplary query is, "Are you [name of newsmaker]? Yes or No". If the reader is the newsmaker, the reader selects "Yes" and a verification web page is displayed. Other embodiments may include one or more, including equivalents, of the following: the dialog box window, or pop-up is displayed only when the reader clicks on the instance; a question such as "Click here if you are a newsmaker in the this article" is displayed conspicuously with the article, for example under the article's headline, and upon clicking, the reader may select from among a list of the newsmakers automatically identified; a list of all of the newsmakers are displayed conspicuously with the article, for example in a panel to the right or left of the article, and each newsmaker instance in the list may by clicked on, directing the reader to a verification web page.

After displaying the article to the reader (step 54), the identity of the reader is electronically verified (step 56) to determine if the reader actually is the newsmaker. Electronic verification (step 56) is commenced when the reader indicates that they are the newsmaker, for example by clicking on an instance as described above. A verification web page is displayed to the reader. The verification page comprises a multiplicity of out-of-wallet questions. Out-of-wallet questions are questions based on credit profiles, credit account information, home mortgage information, and other highly confidential, and difficult to obtain information. The questions, and the answers, called out-of-wallet information, are referred to as "out-of-wallet" because it is information not easily accessible or knowable by anyone but the correct person, even if the correct person were to lose their wallet.

There may be more than one verification page. In one embodiment, electronic verification is commenced and a first set of simple out-of-wallet questions are generated. A first verification page is displayed showing the newsmaker's name and the first set of out-of-wallet questions. By way of example, the first set of out-of-wallet questions ask for the reader's address, telephone number, and social security number. The reader provides answers, that is out-of-wallet information, to the first set of out-of-wallet questions, and the out-of-wallet information is transmitted to a verification database. The out-of-wallet information is compared to data in the verification database. If the out-of-wallet information matches data stored in the record for the newsmaker in the database, a second set of much more challenging out-of-wallet questions is generated from other data in the record of the newsmaker in the database. For example, the second set of out-of-wallet questions asks for home mortgage information, information from credit bureaus such as loan amounts, and information from the Department of Motor Vehicles. The reader provides answers, that is out-of-wallet information, to the second set of out-of-wallet questions, and the out-of-wallet information is transmitted to the verification database, the out-of-wallet information is compared to the data in the newsmaker's record in the database, and results of the comparison are received from the verification database.

In another embodiment, a single verification page poses a multiplicity of out-of-wallet questions. An a priori determination of the actual identity of the newsmaker is made from the article, and/or from other sources such as other articles and public records. This is possible, in particular, for high profile newsmakers, such as politicians or celebrities, where there is an abundance of information about them publicly available. In this embodiment, the a priori determination is made and the multiplicity of out-of-wallet questions are generated by referencing the record for the newsmaker in the verification database. Next the reader's answers, that is the out-of-wallet information, is transmitted to the verification database. Then, the out-of-wallet information is compared to data in the record of the newsmaker in the verification database. Next, the results of the comparison are received from the verification database.

In one embodiment the results of the comparison comprise a simple Boolean yes/no answer to the question of whether the reader is the newsmaker. In another embodiment the results of the comparison comprise a risk score, for example a percentage such as 80/100, the higher the percentage the higher the confidence of positive verification. In this embodiment a tolerance level is set so that if the percentage is below the tolerance level the verification is considered false, and if it is above the tolerance level the verification is considered to be positive.

Upon positive reader verification the reader is optionally invited to create a user account comprising a unique username and password. Once created the reader/newsmaker may simply log on to the account, thereby bypassing the verification process for any future commenting.

The verification database comprises several sub-databases, such as databases from credit bureaus, department of motor vehicles, the US postal service, phone directories, public records, social security numbers, state records, and federal records. Other databases such as health records, criminal databases, and the like, may also be accessed. There are many commercially available products for identity verification employing these and other database. For example, "VPid" from verifiedperson.com, and Consumer Authentication Service (CAS) from Verisign, Inc.

Communications with the verification database, which comprise confidential information, are encrypted. For example, all verification data transmitted to and received from the verification database, out-of-wallet information transmitted from the client, and other sensitive communications use at least one industry-standard protocol such as Secure Sockets Layer (SSL), HTTPS, passwords, digital certificates, and Kerberos tickets, Most commercially available databases, employ these and other protocols and authentication methods. Most commercially available databases also provide an application programming interface (API), for example a JAVA API, to minimize complexity in interfacing and communicating with the verification database. Other standards may be employed, such as XML (Extensible Markup Language), for communicating data between web sites, databases, and other Internet connected resources.

Turning back to FIG. 4, after positive verification, or logon in the event the reader has previously been verified and has created a user account, comments provided by the reader are stored (step 58). A web page is displayed into which the reader may enter comments, corrections, opinions, and other text. The reader may optionally attach files, links, and documents such as photos, URLs and URIs, RSS and other content syndication feeds, video files, audio files, links to audio files, links to video files, images, and links to articles. These and other submissions are referred to herein broadly as "comments". Briefly referring back to FIG. 3, the comments, along with any other information, such as user account information, are stored in NVC 30.

Finally, the comments and the article are published (step 60) such that the comments are displayed conspicuously with the article on any Internet connected client computer accessing the article. For example a request from a client computer (18 of FIG. 3) to view an article from a news aggregator server (20 of FIG. 3) causes both the article and the comments associated with the article to be compiled into a web page and delivered to the client.

The newsmaker's comments may be displayed in many ways: in their entirety, in an abridged version, as a headline or other "teaser" within or next to the article, and where clicking on the headline displays the full comments; in a separate pane next to or within the text of the article; and such that when a mouse cursor passes over an instance the newsmaker's comments are displayed in a pop-up. Those skilled in the art will appreciate that there are many ways of displaying the article and newsmaker comments on a web page.

Figure 5:
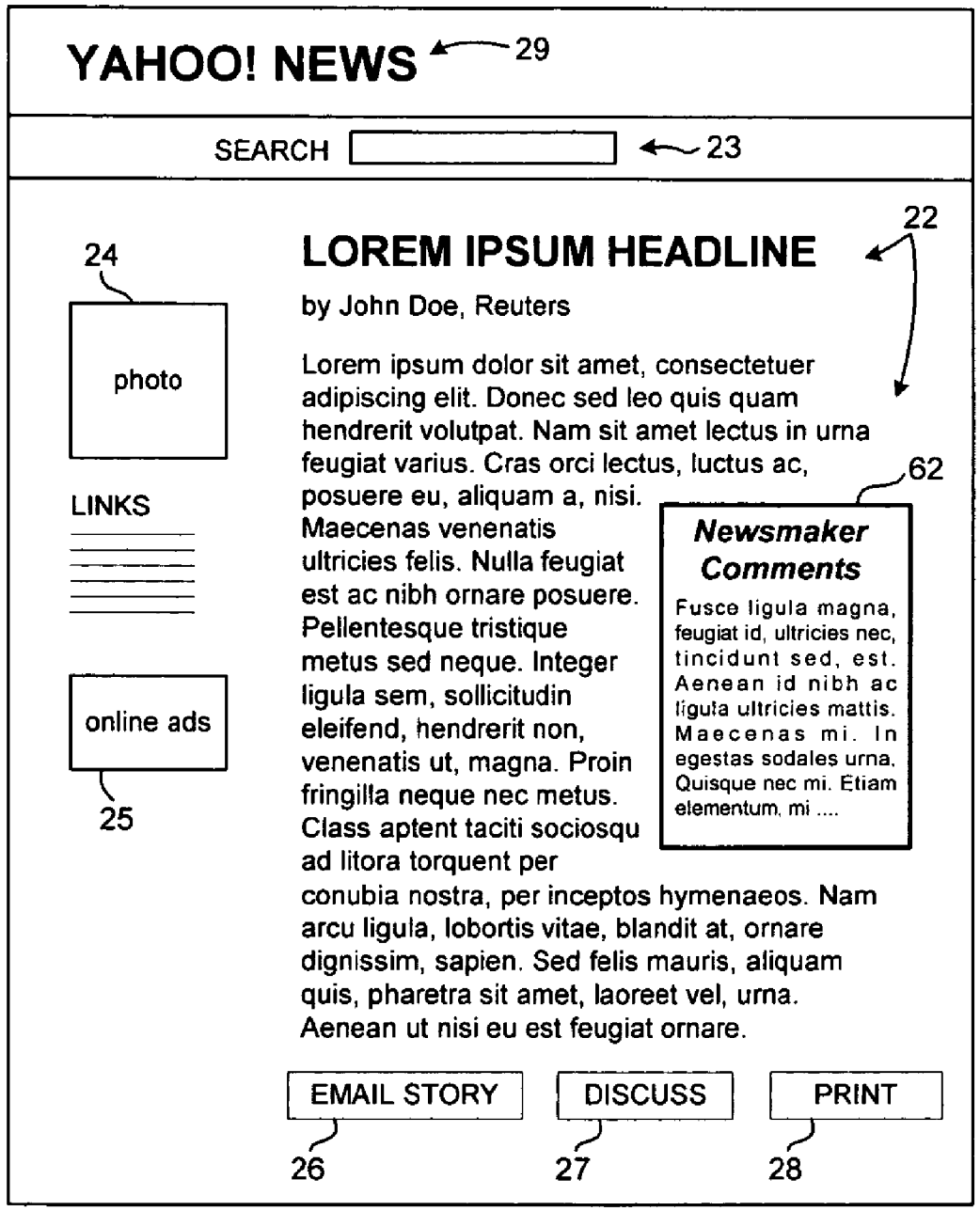
FIG. 5 is a screenshot image of a web page displaying the published article and newsmaker comments.

Referring to FIG. 5, an exemplary screen shot of a web page displaying the published article and comments is shown. The web page shares many similarities to the prior art web page of FIG. 2, for example the name of the news source or news aggregator 29, a search bar or search function 23, the story including the headline and the author 22, an image 24, online advertising 25, an "email story" link or button 26, a "print" link or button 28, and a "discuss" link or button 27. Additionally, the published article includes newsmaker comments 62, displayed conspicuously with the article, and positioned such that the text of the article flows around the newsmaker's comments. It is appreciated by those skilled in the art that many other layouts for the published article and comments are possible.

With the above disclosure in mind, it is noted that other modifications to the present invention are possible. For example, other readers may flag a reader who was falsely identified as a newsmaker. If upon reading a newsmaker's comments, other readers are suspicious that that the comments are fraudulent, the other readers may flag the newsmaker's comments. Flagging may have many consequences, for example, the newsmaker's comments cease being displayed until the newsmaker can be re-verified, the newsmaker's identity is forced to be re-verified, and the newsmaker's identity is forced to be manually verified, that is, to be verified by a person.

Manually verifying the identity of the reader as the newsmaker may be performed as a supplement to the step of electronically verifying. In some cases, manually verifying may be the only form of verification. Also, the names of the newsmakers may be manually identified, that is, a person such as an editor may identify the newsmakers by reading the article.

In the unlikely event that two or more newsmakers share the same name in an article, the step of verifying may include a step of selecting the newsmaker that refers to the reader. For example, if an article comprises two different newsmakers each named John Doe, the step of verification may include a page displaying both names with additional information such as "Click here if you are the John Doe who said [quote from first John Doe in the article]" and "Click here if you are the John Doe who said [quote from second John Doe in the article]". If quotes are not available in the article, other identifying information from the article may be used. After selecting a John Doe, the step of verification continues as detailed above.

Finally, it is noted that an article may comprise other content. For example a "newsmaker topic web page" may be an article. A newsmaker topic page comprises content related to or connected with a newsmaker. The content may comprise articles in which the newsmaker is mentioned, comments the newsmaker has made, other articles, news, background information, a biography, miscellaneous comments by the newsmaker which are not in response to an article, and similar information connected to the newsmaker. As described above, the article is displayed to a reader and the article, that is the newsmaker topic page, further comprises a link such as "Click here if you are [name of newsmaker] or a representative of [name of newsmaker]" which, upon clicking, initiates the step of verifying the reader. In this way the newsmaker may modify and add content on the newsmaker's topic page.

The foregoing detailed description has discussed only a few of the many forms that this invention can take. It is intended that the foregoing detailed description be understood as an illustration of selected forms that the invention can take and not as a definition of the invention. It is only the following claims, including all equivalents, that are intended to define the scope of this invention.

What is claimed is:

1. A newsmaker verification and commenting method for internet based on-line publishing wherein on-line articles served from one or more news servers connected to the internet are displayed on an internet connected client computer configured to access and display the articles to a reader, the method comprising the steps of:
   providing an article comprising text, wherein at least some of the text comprises an instance comprising the name of a newsmaker;
   automatically identifying the name of the newsmaker;
   displaying the article to the reader;
   electronically verifying the identity of the reader as the newsmaker;
   if the identity of the reader is verified as the newsmaker, (i) storing comments provided by the reader; and (ii) publishing the comments and the article; whereby the comments are displayed conspicuously with the article.

2. The method of claim 1 wherein said step of publishing comprises generating computer readable code which when read by a computer causes a web browser to display web browser content, whereby the computer readable code is accessible to any computer connected to the internet.

3. The method of claim 1 further comprising after said step of electronically verifying, if the identity of the reader is verified as the newsmaker, creating a user account for the reader.

4. The method of claim 1 wherein said step of electronically verifying comprises generating out-of-wallet questions from a verification database, transmitting out-of-wallet information to the verification database, comparing the out-of-wallet information to the verification database, and receiving comparison results.

5. The method of claim 4 wherein said steps of transmitting and receiving comprise transmitting and receiving by way of the internet.

6. The method of claim 1 wherein said step of displaying comprises emphasizing the instance such that the instance is set apart from the text.

7. The method of claim 6 wherein said step of emphasizing comprises modifying text attributes of the instance, wherein the text attributes comprise a font type, a font size, and a font color.

8. The method of claim 6 wherein said step of emphasizing comprises displaying the newsmaker in a list.

9. The method of claim 1 wherein said step of automatically identifying comprises analyzing the text of the article with entity extraction methods.

10. The method of claim 1 wherein the instance comprises an image of the newsmaker.

11. A newsmaker verification and commenting method for internet based on-line publishing wherein on-line articles served from one or more news servers connected to the internet are displayed on an internet connected client computer configured to access and display the articles to a reader, the method comprising the steps of:
   providing an article comprising text, wherein at least some of the text comprises an instance comprising the name of a newsmaker;
   automatically identifying the name of the newsmaker, wherein said step of automatically identifying comprises analyzing the text of the article with entity extraction methods;
   displaying the article to the reader, wherein said step of displaying comprises emphasizing the instance such that the instance is set apart from the text;
   electronically verifying the identity of the reader as the newsmaker, wherein said step of electronically verifying comprises generating out-of-wallet questions from a verification database, transmitting out-of-wallet information to the verification database, comparing the out-of-wallet information to the verification database, and receiving comparison results;
   if the identity of the reader is verified as the newsmaker, (i) storing comments provided by the reader; (ii) publishing the comments and the article; whereby the comments are displayed conspicuously with the article.

12. A newsmaker verification and commenting system for internet based on-line publishing wherein news articles served from one or more news servers connected to the internet are displayed on an internet connected client computer configured to access and display the articles to a reader, the system comprising:
   means for automatically identifying the name of the newsmaker;
   means for displaying the article to the reader:
   means for electronically verifying the identity of the reader as the newsmaker;
   means for storing comments provided by the reader; and
   means for publishing the comments and the article.

13. The system of claim 12 wherein said means for automatically identifying further comprises entity extraction means for analyzing text and extracting the name.

14. The system of claim 12 wherein said means for displaying further comprises means for emphasizing the instance.

15. The system of claim 12 wherein said means for electronically verifying further comprises verification database means for generating out-of-wallet questions and comparing out-of-wallet information with a verification database.

16. The system of claim 12 further comprising means for flagging the identity of the reader as the newsmaker.

17. A newsmaker verification and commenting method for internet based on-line publishing wherein on-line articles served from one or more news servers connected to the internet are displayed on an internet connected client computer configured to access and display the articles to a reader, the method comprising the steps of:
   providing an article comprising text, wherein at least some of the text comprises an instance comprising the name of a newsmaker;
   identifying the name of the newsmaker;
   displaying the article to the reader, wherein said step of displaying comprises emphasizing the instance such that the instance is set apart from the text;

verifying the identity of the reader as the newsmaker;

if the identity of the reader is verified as the newsmaker, (i) storing comments provided by the reader; and (ii) publishing the comments and the article.

18. The method of claim 17 wherein said step of identifying comprises automatically identifying the name of the newsmaker.

19. The method of claim 17 wherein said step of identifying comprises manually identifying the name of the newsmaker.

20. The method of claim 17 wherein said step of verifying comprises electronically verifying the identity of the reader as the newsmaker.

21. The method of claim 17 wherein said step of verifying comprises manually verifying the identity of the reader as the newsmaker.

\* \* \* \* \*